United States Patent
Chuang et al.

(10) Patent No.: US 12,429,683 B2
(45) Date of Patent: Sep. 30, 2025

(54) BINOCULAR TELESCOPE

(71) Applicant: Foshan City Nanhai Weihong Mold Product Co., Ltd., Foshan (CN)

(72) Inventors: Li-Fu Chuang, Foshan (CN); Ping Long, Foshan (CN)

(73) Assignee: FOSHAN CITY NANHAI WEIHONG MOLD PRODUCT CO., LTD., Nanhai Foshan (CN)

( * ) Notice: Subject to any disclaimer, the term of this patent is extended or adjusted under 35 U.S.C. 154(b) by 973 days.

(21) Appl. No.: 17/539,340

(22) Filed: Dec. 1, 2021

(65) Prior Publication Data
US 2023/0075072 A1    Mar. 9, 2023

(30) Foreign Application Priority Data
Sep. 3, 2021    (CN) .................. 202122128209.4

(51) Int. Cl.
    *G02B 23/10*     (2006.01)
    *G01C 1/00*     (2006.01)
    (Continued)

(52) U.S. Cl.
    CPC ............. *G02B 23/105* (2013.01); *G01C 1/00* (2013.01); *G01C 15/008* (2013.01);
    (Continued)

(58) Field of Classification Search
CPC ........ G02B 23/105; G02B 27/30; G01C 1/00; G01C 15/008; G01S 7/4861; G01S 17/42; H02H 3/20
(Continued)

(56) References Cited

U.S. PATENT DOCUMENTS 6,002,473 A  \*   12/1999    West ...................... G01B 11/26
                                                               356/153
2008/0001022 A1\*   1/2008    Sa ....................... G01C 21/1654
                                                                  244/3.1

(Continued)

FOREIGN PATENT DOCUMENTS

CN          203274727 U    11/2013
CN          203274728 U    11/2013
(Continued)

*Primary Examiner* — Sharrief I Broome
(74) *Attorney, Agent, or Firm* — MUNCY, GEISSLER, OLDS & LOWE, P.C.

(57) ABSTRACT

A binocular telescope includes a pair of Schmidt-Pechan roof prisms, one half pentaprism, a right-angle prism, a main circuit board, and an auxiliary circuit board. The half pentaprism is connected to a lateral surface of another half pentaprism, and includes a lateral surface substantially faces the other half pentaprism. The right-angle prism includes one lateral surface connected to the lateral surface of the half pentaprism, and another lateral surface whose normal is perpendicular to the normals of the lateral surfaces of both the half pentaprism and the another half pentaprism. A light emitter and a light receiver of the auxiliary circuit board are arranged above the another lateral surface of the right-angle prism and electrically connected with the main circuit board respectively. Therefore, the binocular telescope is arranged in a centralized manner, so that the complexity in production and maintenance is effectively reduced.

18 Claims, 6 Drawing Sheets

(51) Int. Cl.
  *G01C 15/00*  (2006.01)
  *G01S 7/4861*  (2020.01)
  *G01S 17/42*  (2006.01)
  *G02B 27/30*  (2006.01)
  *H02H 3/20*  (2006.01)
(52) U.S. Cl.
  CPC ............ *G01S 7/4861* (2013.01); *G01S 17/42* (2013.01); *G02B 27/30* (2013.01); *H02H 3/20* (2013.01)
(58) Field of Classification Search
  USPC ......................................................... 359/407
  See application file for complete search history.

(56) References Cited

U.S. PATENT DOCUMENTS

| | | | |
|---|---|---|---|
| 2008/0068721 A1* | 3/2008 | Murnan ............. | G03F 7/70383 359/629 |
| 2008/0083886 A1* | 4/2008 | Faklis ................ | G02B 27/0972 250/504 R |
| 2009/0079960 A1* | 3/2009 | Chung .................... | G01S 17/86 356/28 |
| 2019/0154439 A1 | 5/2019 | Binder | |
| 2020/0088987 A1* | 3/2020 | Zhu ...................... | G02B 17/045 |
| 2020/0341261 A1* | 10/2020 | Qian ...................... | G02B 17/04 |

FOREIGN PATENT DOCUMENTS

| | | |
|---|---|---|
| CN | 204302569 U | 4/2015 |
| EP | 3144713 A1 | 3/2017 |
| WO | 2012131548 A1 | 10/2012 |

\* cited by examiner

BINOCULAR TELESCOPE

CROSS-REFERENCE TO RELATED APPLICATION

This non-provisional application claims priority under 35 U.S.C. § 119(a) to Patent Application No. 202122128209.4 filed in China, P. R. C. on Sep. 3, 2021, the entire contents of which are hereby incorporated by reference.

BACKGROUND

Technical Field

The present invention relates to a binocular telescope, and particularly to an electronic binocular telescope.

Related Art

Telescope has a history of more than 400 years since invented. Nowadays, pure optical telescopes have been gradually replaced with electronic telescopes.

For an electronic telescope, sensing elements and circuit boards are distributed at multiple positions inside the electronic telescope, which is unfavorable for the assembling and maintenance of the telescope and greatly increases the production and maintenance cost. In addition, each of the elements and the circuit boards are fixed to a specific position, so it is difficult to perform light path calibration responsive to a change of a technical parameter of each element. Moreover, the application scenarios of the existing electronic telescope are limited.

Therefore, it is necessary to improve the telescope.

SUMMARY

In view of this, the present invention discloses a binocular telescope. According to some embodiments, the binocular telescope includes a pair of Schmidt-Pechan roof prisms, a second half pentaprism, a right-angle prism, a main circuit board, and an auxiliary circuit board. Each of the Schmidt-Pechan roof prisms includes a first half pentaprism and a Schmidt roof prism. Each of the first half pentaprisms includes a first lateral surface. The first lateral surface of each of the first half pentaprisms substantially faces the other first half pentaprism. The second half pentaprism is connected to the first lateral surface of one of the first half pentaprisms and includes a second lateral surface. The second lateral surface of the second half pentaprism substantially faces the other first half pentaprism. The right-angle prism includes a third lateral surface and a fourth lateral surface. The third lateral surface and the fourth lateral surface are spatially perpendicular to each other. The third lateral surface of the right-angle prism is connected to the second lateral surface of the second half pentaprism. A normal of the fourth lateral surface of the right-angle prism is perpendicular to an imaginary plane. The imaginary plane includes a normal of the first lateral surface and a normal of the second lateral surface. The main circuit board includes a control module. The auxiliary circuit board includes a light emitting and receiving module. The light emitting and receiving module includes a light emitter and a light receiver. The light emitter and the light receiver are arranged above the fourth lateral surface of the right-angle prism and electrically connected with the main circuit board respectively.

DETAILED DESCRIPTION

Figure 1:
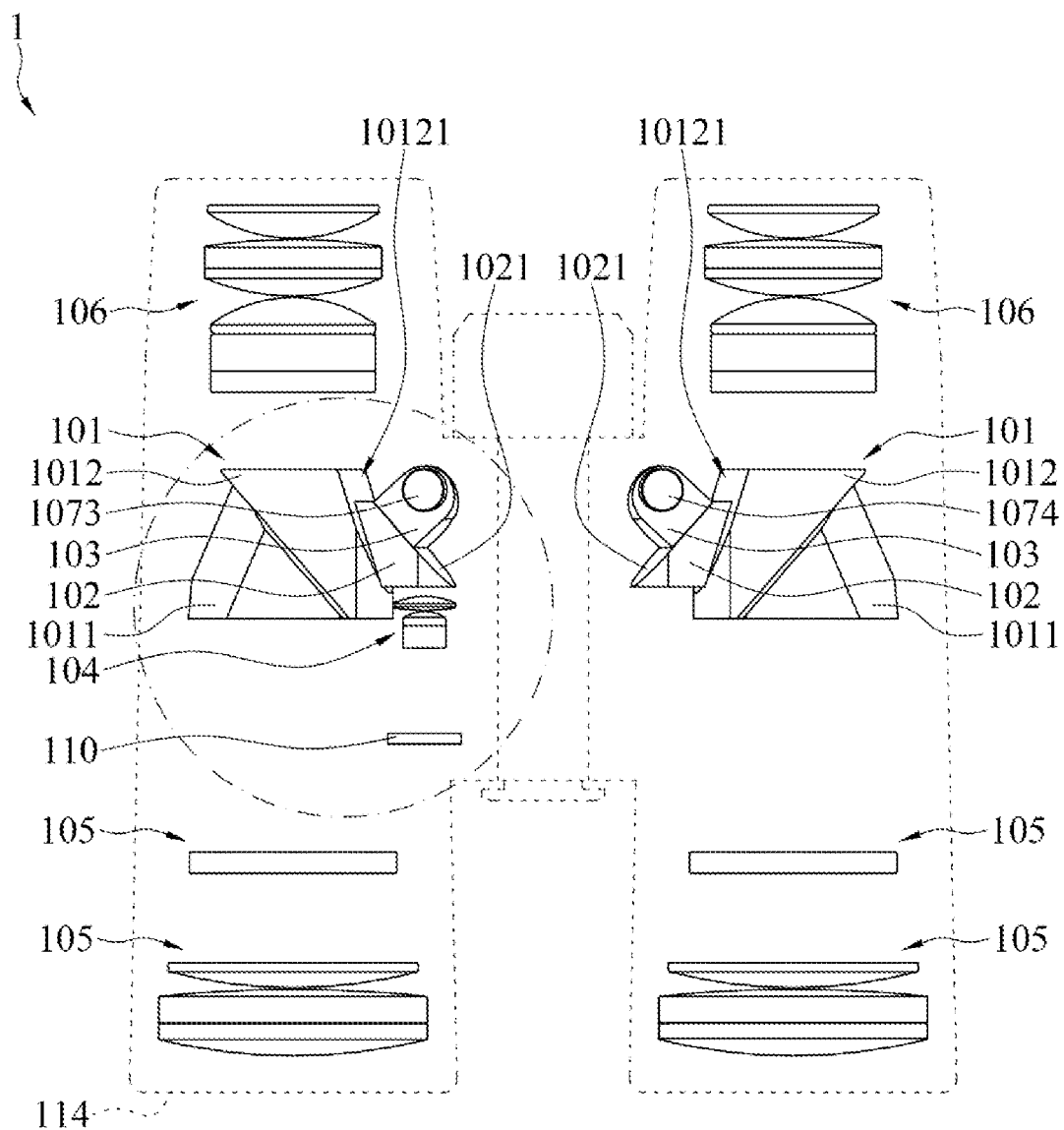
FIG. 1 is a top perspective view of a binocular telescope according to some embodiments.

FIG. 1 is a top perspective view of a binocular telescope according to some embodiments, and reference is made to FIG. 1. According to some embodiments, a binocular telescope 1 includes Schmidt roof prisms 1011, first half pentaprisms 1012, a second half pentaprism 102, a right-angle prism 103, an objective lens group 105, an eyepiece group 106, and other optical elements, and includes a light emitter 1073, a light receiver 1074, and a housing 114. The Schmidt roof prisms 1011 and the first half pentaprisms 1012 are mutually connected to form Schmidt-Pechan roof prisms 101. According to some embodiments, the housing 114 includes a left cavity and a right cavity. Each of the left cavity and the right cavity includes a group of the above-mentioned Schmidt-Pechan roof prism 101. The left cavity or the right cavity includes a group of the above-mentioned second half pentaprism 102 and right-angle prism 103. According to some embodiments, each of the left cavity and the right cavity includes a group of the above-mentioned optical elements. Each optical element may be symmetrically disposed in the left cavity and the right cavity.

The first half pentaprism 1012 includes a first lateral surface 10121. The first lateral surface 10121 substantially faces the other first half pentaprism 1012. According to some embodiments, the substantially facing is not limited to directly facing the other first half pentaprism 1012 as long as an included angle of the first lateral surface 10121 of each of the first half pentaprisms 1012 is smaller than 90 degrees. According to some embodiments, the first lateral surfaces 10121 of the first half pentaprisms 1012 face a symmetry plane of the two respectively. The second half pentaprism 102 is connected to the first lateral surface 10121 of one of the first half pentaprisms 1012. The second half pentaprism 102 includes a second lateral surface 1021. The second lateral surface 1021 substantially faces the other first half pentaprism 1012. As described above, the substantially facing is also not limited to direct facing the other first half pentaprism 1012. The right-angle prism 103 includes a third lateral surface 1031 and a fourth lateral surface 1032. The third lateral surface 1031 is perpendicular to the fourth lateral surface 1032. According to some embodiments, the fourth lateral surface 1032 faces a part over or under the binocular telescope 1, i.e., a direction extending into or out of the paper in FIG. 1. The third lateral surface 1031 of the right-angle prism 103 is connected to the second lateral surface 1021 of the second half pentaprism 102. According to some embodiments, a normal of the first lateral surface

10121 and a normal of the second lateral surface 1021 jointly define a plane where the paper in FIG. 1 is located. In other words, the first lateral surface 10121 and the second lateral surface 1021 are perpendicular to the paper in FIG. 1. Therefore, the right-angle prism 103 reflects light emitted from the second lateral surface 1021 of the second half pentaprism 102 to a direction perpendicular to the paper in FIG. 1 or reflects light perpendicular to the paper in FIG. 1 to the second half pentaprism 102. Each of the above-mentioned prisms may be connected by direct bonding or adhesion with an adhesive. The adhesive may be, but not limited to, an ultraviolet curing adhesive or an Optical Clear Adhesive (OCA). Therefore, losses generated when light passes through media with different refractive indexes (e.g., glass-air) in a transmission process are reduced effectively, and the distance measurement performance is improved. Each of the elements may be fixed in the housing 114 by clamping or adhesion.

Figure 2:
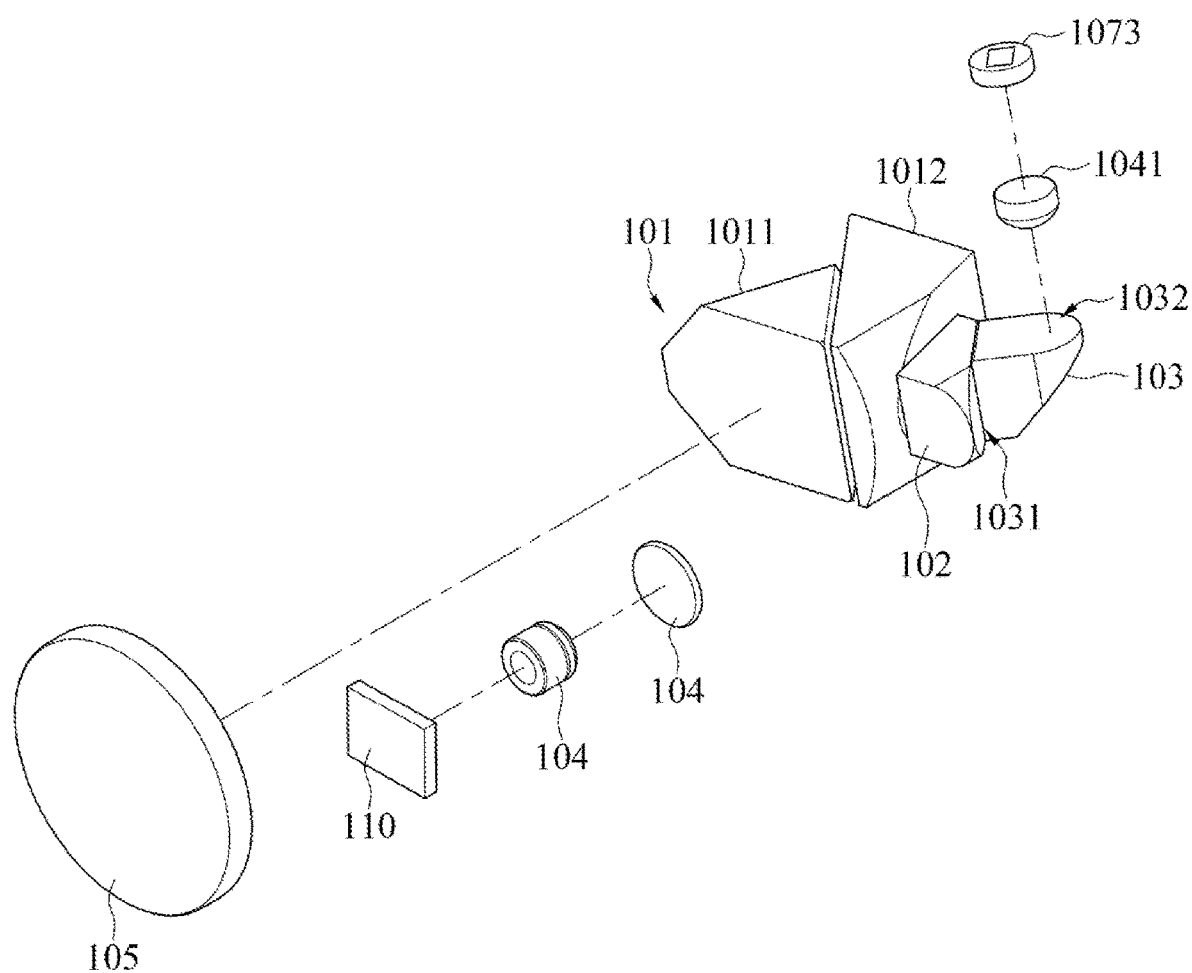
FIG. 2 is an exploded view of a lens group of a dotted part in FIG. 1.

FIG. 2 is an exploded view of a lens group of a dotted part in FIG. 1, and reference is made to FIG. 2. The light emitter 1073 may be arranged above the fourth lateral surface 1032 of the right-angle prism 103, so that the right-angle prism 103 may reflect perpendicular light emitted by the light emitter 1073 to form horizontal light. The light receiver 1074 may be arranged instead where the light emitter 1073 is arranged in FIG. 2. According to some embodiments, the light emitter 1073 and the light receiver 1074 are disposed above the right-angle prisms 103 of the left cavity and the right cavity respectively. According to some embodiments, both the light emitter 1073 and the light receiver 1074 are disposed above the right-angle prism 103 of the left cavity or the right cavity.

According to some embodiments, a collimation lens 1041 is arranged between the light emitter 1073 or the light receiver 1074 and the fourth lateral surface 1032 of the right-angle prism 103. The collimation lens 1041 may be directly connected to a surface of the light emitter 1073 or the light receiver 1074 or to the fourth lateral surface 1032, or may be connected to the housing 114 rather than directly connected with the light emitter 1073, the light receiver 1074 or the right-angle prism 103. The collimation lens 1041 may be configured to converge light and adjust a focal length to help to improve a beam intensity of emitted light and focus received light to a sensing surface of the light receiver 1074. For example, the light emitter 1073 emits a beam. The beam is converged by the collimation lens 1041 and emitted to the right-angle prism 103. The light is reflected by the right-angle prism 103 to be perpendicular and then emitted to the second half pentaprism 102. The light penetrates through the second half pentaprism 102 and the first half pentaprism 1012 and then is reflected inside the Schmidt roof prism 1011 to penetrate through the objective lens group 105 to an observed target. The light penetrates through the objective lens group 105 to enter the Schmidt roof prism 1011 after being reflected by the observed target. The light enters the first half pentaprism 1012 after being reflected inside the Schmidt roof prism 1011. Part of the light is reflected by the first half pentaprism 1012 and emitted to the eyepiece group 106 to be observed by a user, while the other part of the light penetrates through the first half pentaprism 1012 and the second half pentaprism 102 to enter the right-angle prism 103 and is focused to the light receiver 1074 by the collimation lens 1041 after being reflected by the right-angle prism 103.

Figure 3:
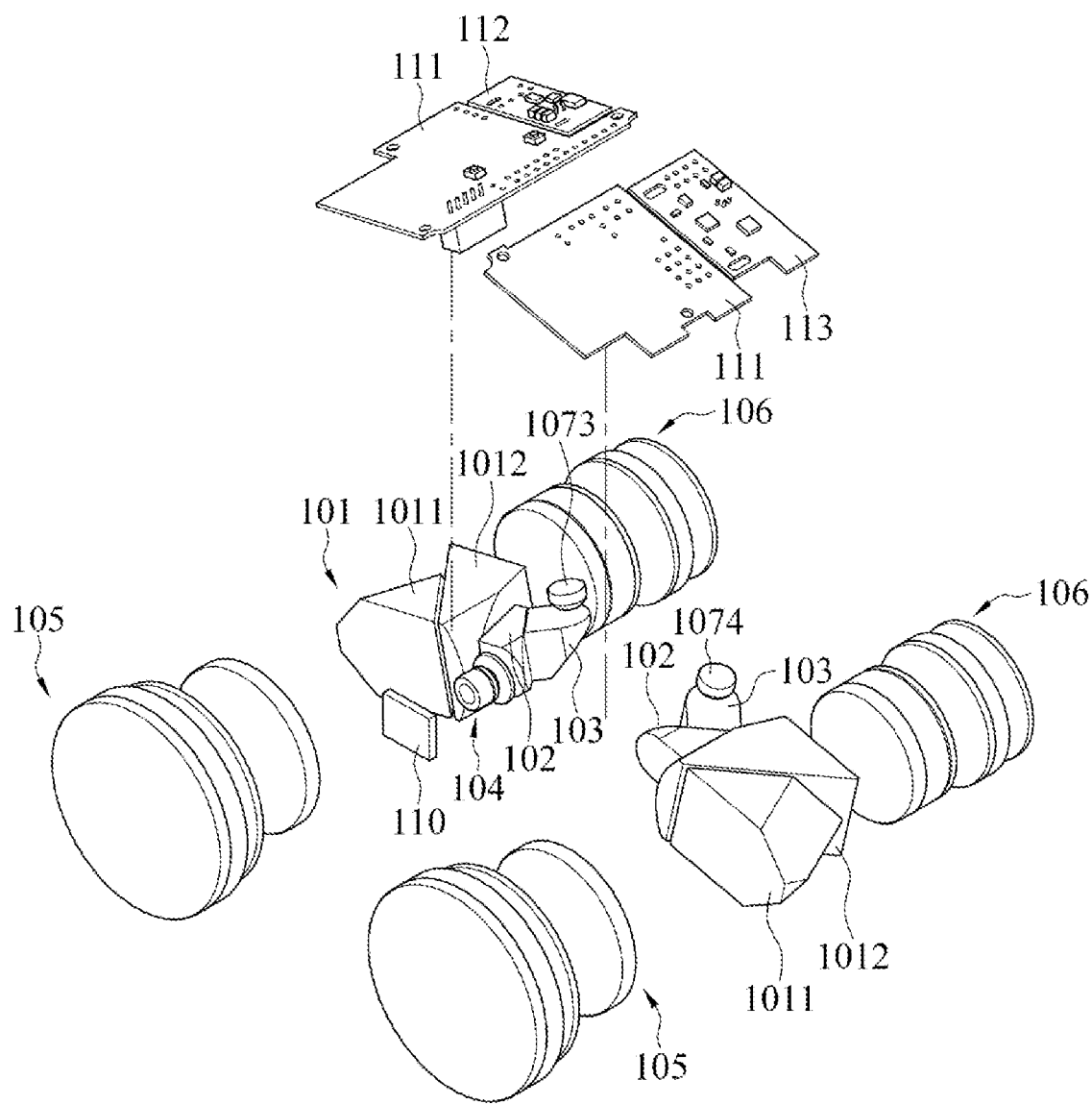
FIG. 3 is an exploded view of a circuit board configuration of a binocular telescope according to some embodiments.

FIG. 3 is an exploded view of a circuit board configuration of a binocular telescope according to some embodiments, and reference is made to FIG. 3 in combination with FIG. 2. According to some embodiments, the binocular telescope 1 includes a main circuit board 111 and an auxiliary circuit board. The auxiliary circuit board is electrically connected to the main circuit board 111. The circuit boards may be electrically connected by a wire, welding, or inserting. The auxiliary circuit board may include a first auxiliary circuit board 112 and a second auxiliary circuit board 113 which are arranged separately. According to some embodiments, the first auxiliary circuit board 112 and the second auxiliary circuit board 113 may be disposed above or below the left cavity and the right cavity respectively, and the main circuit board 111 may be disposed therebetween. According to some embodiments, the main circuit board 111 and the auxiliary circuit board are disposed above or below the binocular telescope 1 in a centralized manner. As such, the binocular telescope 1 may be conveniently maintained or assembled without disassembling for separate treatment. According to some embodiments, the main circuit board 111 is parallel to the auxiliary circuit board. Therefore, the main circuit board 111 or the auxiliary circuit board is prevented from interfering with each other when being assembled or maintained.

According to some embodiments, the main circuit board 111 includes a control module 108. The auxiliary circuit board includes a light emitting and receiving module 107. The light emitting and receiving module 107 includes a light emitter 1073 and a light receiver 1074. According to some embodiments, the light emitter 1073 is arranged on the first auxiliary circuit board 112. The light receiver 1074 is arranged on the second auxiliary circuit board 113. The light emitter 1073 or the light receiver 1074 may be arranged to be connected to the auxiliary circuit board through a wire, but is not limited thereto, and may be directly welded to a surface of the auxiliary circuit board or fixed to the auxiliary circuit board through a pin, a pin header or a bayonet socket. Therefore, the light emitter 1073 or the light receiver 1074 may be prevented from being easily moved to cause a light path offset. According to some embodiments, there may be a single auxiliary circuit board which disposed above or below the left cavity or the right cavity. According to some embodiments, both the light emitter 1073 and the light receiver 1074 are arranged on the auxiliary circuit board. According to some embodiments, the main circuit board 111 and the auxiliary circuit board are disposed independently. In such case, an element (e.g., a processor 1082 or other chips) with a relatively low process tolerance or with relatively high price may be disposed on the main circuit board 111, and an element (e.g., the light emitter 1073, the light receiver 1074, or other sensors) with a relatively high process tolerance may be disposed on the auxiliary circuit board. This is favorable for maintaining or replacing the auxiliary circuit board independently without affecting the main circuit board 111. According to some embodiments, the light emitter 1073 and the light receiver 1074 are independently disposed on different auxiliary circuit boards. Therefore, an electromagnetic noise is unlikely to affect the auxiliary circuit board at the end of the light receiver 1074 or the main circuit board 111 when the auxiliary circuit board at the end of the light emitter 1073 is triggered to generate an electrical signal. According to some embodiments, an electromagnetic shield such as a tin foil and a metal mesh may further be arranged between each auxiliary circuit board and the main circuit board 111.

According to some embodiments, the auxiliary circuit board may be movably arranged above the fourth lateral surface 1032 of the right-angle prism 103. For example, the auxiliary circuit board itself is not fixedly connected to a shell but connected to the main circuit board 111 through a wire with a certain mobility. For example, multiple clamping points are arranged on a side wall of the shell such that the auxiliary circuit board may be clamped to different clamping points as required with a certain mobility. Therefore, a distance between the auxiliary circuit board and a fourth plane of the right-angle prism 103 may be adjusted without affecting the main circuit board 111 when a light focus point is required to be calibrated in a production process. For example, emission angle parameters of different Light-Emitting Diodes (LEDs) have tolerances, and distances between the LED light emitter 1073 arranged on the auxiliary circuit board and each of the collimation lens 1041 and the right-angle prism 103 are adjusted to calibrate the focus point. Difficulties in calibration are reduced, and the production efficiency is improved.

Reference is made to FIG. 2 in combination with FIG. 1. According to some embodiments, the binocular telescope 1 includes Schmidt-Pechan roof prisms 101, a second half pentaprism 102, a right-angle prism 103, an objective lens group 105, an eyepiece group 106, a light emitter 1073, a light receiver 1074, a display screen 110, a projection lens group 104, and a housing 114. According to some embodiments, each of left and right cavities of the binocular telescope 1 includes a group of Schmidt-Pechan roof prism 101. The display screen 110 is arranged between the Schmidt-Pechan roof prisms and electrically connected to the control module 108 of the main circuit board 111. According to some embodiments, the display screen 110 is arranged below the main circuit board 111 or the auxiliary circuit board. The display screen 110 may be directly welded to the circuit board or connected to the circuit board by a wire, but is not limited thereto, and may be fixed to the circuit board by a pin, a pin header, a bus, a bayonet socket or the like. Therefore, when the display screen 110 is assembled or maintained, it only needs to simply dispose, at a corresponding position, or take out the main circuit board 111 or the auxiliary circuit board without disassembling the whole binocular telescope 1 for an individual element of the display screen 110. According to some embodiments, the display screen 110 faces an incidence plane of the second half pentaprism 102. The second half pentaprism 102 reflects light generated by the display screen 110 into the Schmidt-Pechan roof prism 101. The Schmidt-Pechan roof prism 101 reflects the light to the eyepiece group 106 such that the user may observe the light. The display screen 110 may be configured to display, by projection, information such as a distance or included angle between the binocular telescope 1 and the observed target, a speed of the observed target, power of a battery 1091, and a reticle. According to some embodiments, the projection lens group 104 may be a convex lens, so as to magnify an image of the display screen 110. The projection lens group 104 is arranged between the display screen 110 and the second half pentaprism 102, and may be directly connected to the display screen 110 or a surface of the second half pentaprism 102 or connected to the housing 114 rather than being directly connected with the display screen 110 or the second half pentaprism 102.

Figure 4:
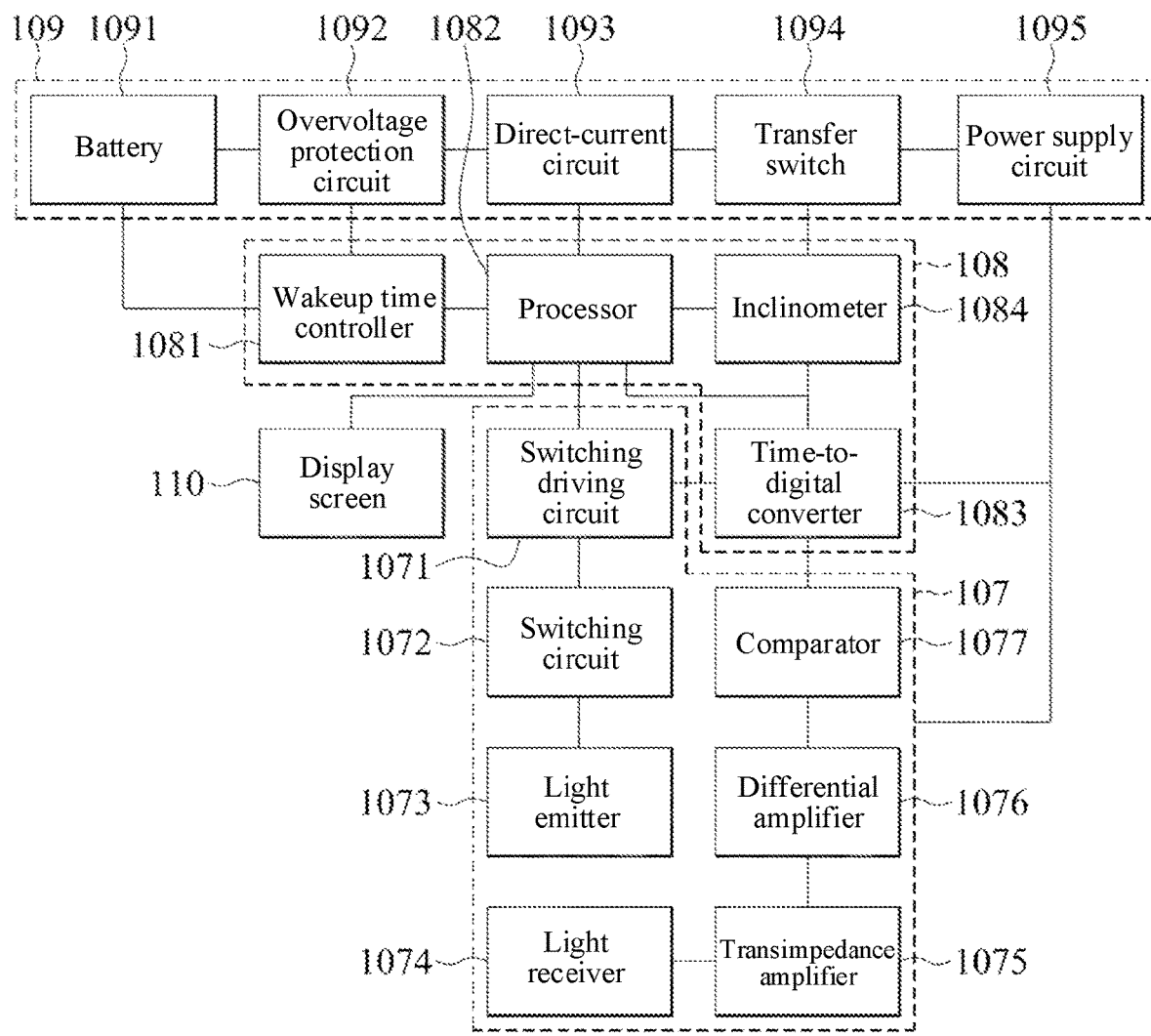
FIG. 4 is a schematic block diagram of a circuit system of a binocular telescope according to some embodiments.

FIG. 4 is a schematic block diagram of a circuit system of a binocular telescope according to some embodiments, and reference is made to FIG. 4. According to some embodiments, the circuit system of the binocular telescope 1 includes a light emitting and receiving module 107, a control module 108, and a power management module 109. The light emitting and receiving module 107 may include a switching driving circuit 1071, a switching circuit 1072, a light emitter 1073, a light receiver 1074, a differential amplifier 1076, and a comparator 1077. The control module 108 may include a wakeup time controller 1081, a processor 1082, and a time-to-digital converter. The power management module 109 may include elements such as a battery 1091, an overvoltage protection circuit 1092 and a direct-current circuit 1093 as a power supply for providing power, and includes a transfer switch 1094 and a power supply circuit 1095.

According to some embodiments, the switching driving circuit 1071 of the light emitting and receiving module 107 is electrically connected to the light emitter 1073 through the switching circuit 1072. The switching driving circuit 1071 may be a wire for connecting the processor 1082 with the switching circuit 1072, or a resistor, or may be a gate driving circuit for driving a field-effect transistor, e.g., a totem-pole driving circuit or a complementary push-pull circuit. The switching driving circuit 1071 may also include a pulse width modulation circuit to drive the switching circuit 1072 to be turned on and off such that the light emitter 1073 generates a plurality of pulsed beams within a short time. The switching circuit 1072 may be a bipolar transistor, a field-effect transistor, a power field-effect transistor, or an insulated gate bipolar transistor. The light emitter 1073 may be a laser emitter 1073 emitting coherent light, but is not limited thereto, and may be a visible light emitter 1073 or an infrared emitter, and a light source thereof may be, but not limited to, a laser diode, an LED, an incandescent light source, a halogen light source, or a fluorescent light source. The light receiver 1074 is electrically connected to the comparator 1077 through the differential amplifier 1076. The light receiver 1074 may be a photodiode, a photoresistor, a photosensitive coupler, an infrared sensor, or other elements. According to some embodiments, a preamplifier is further arranged between the light receiver 1074 and the differential amplifier 1076. The preamplifier may be used as a buffer or amplifies and converts an electrical signal output by the light receiver 1074 into a positive/negative output signal. If the light receiver 1074 is a photodiode, an output signal thereof is a current signal. Therefore, according to some embodiments, the preamplifier is a transimpedance amplifier 1075 for converting the current signal into a voltage signal. The differential amplifier 1076 performs differential amplification on the positive/negative output signal output by the preamplifier and suppresses a received common-mode noise, e.g., a noise from ambient light or a noise generated when the switching circuit 1072 is turned on/off. The comparator 1077 receives and converts a differential signal output by the differential amplifier 1076 into an electrical signal with a rated saturation voltage of the comparator 1077.

According to some embodiments, the wakeup time controller 1081 of the control module 108 is electrically connected to the processor 1082. The processor 1082 is electrically connected to the time-to-digital converter 1083 and the switching driving circuit 1071 of the light emitting and receiving module 107. In addition, the time-to-digital converter 1083 is also electrically connected to the switching driving circuit 1071 of the light emitting and receiving module 107. According to some embodiments, the wakeup time controller 1081 includes a frequency circuit. The wakeup time controller 1081 is electrically connected to a power supply. The power supply powers the processor 1082. When the wakeup time controller 1081 receives an instruction (e.g., an electrical signal generated when the user presses a switch), a driving signal is sent to the processor 1082, and timing is started. After a preset period of time, the wakeup time controller 1081 drives the power supply to turn off the processor 1082. According to some embodiments, the power supply is driven to power the processor 1082 when the wakeup time controller 1081 receives an instruction. Therefore, only the wakeup time controller 1081 needs to be powered when the binocular telescope 1 is in a dormant state, so as to save power. The time-to-digital converter 1083 receives a starting signal sent by the processor 1082, a first time signal sent by the switching driving circuit 1071 and a second time signal sent by the comparator 1077, converts these signals into digital signals represented by time, and directly records the digital signals in a memory or transmits the digital signals back to the processor 1082 to be recorded in the memory by the processor 1082. The processor 1082 may further read the above-mentioned digital signals from the memory and calculate a time difference between two signals to further infer a distance from the observed target. The time-to-digital converter 1083 and the processor 1082 may be connected through a serial peripheral interface such that frequencies of the two are synchronized and the processor 1082 is allowed to select to control a plurality of time-to-digital converters 1083 on the salve side at the same time.

Figure 5A:
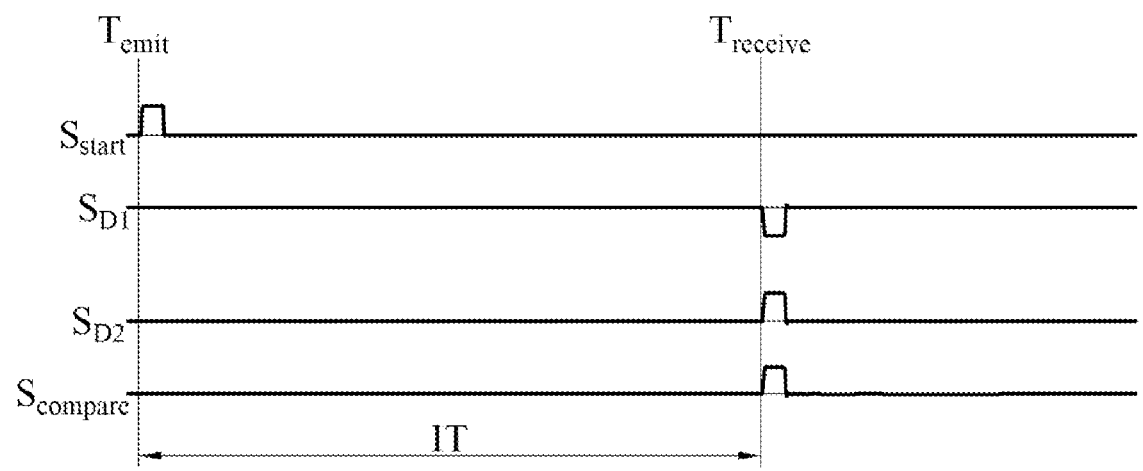
FIG. 5A is a signal timing diagram of a binocular telescope according to some embodiments.
Figure 5B:
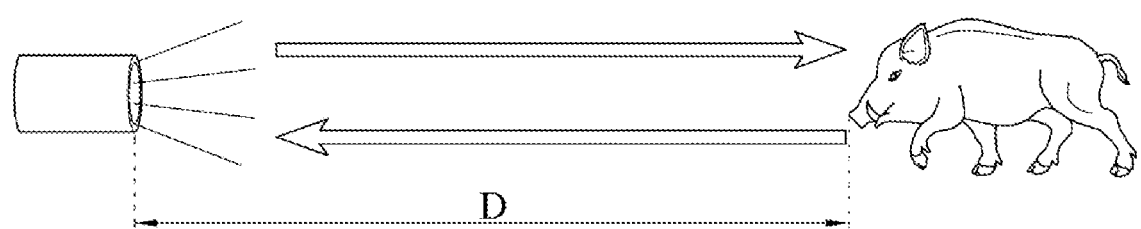
FIG. 5B is a schematic diagram of distance measurement of a binocular telescope according to some embodiments.

FIG. 5A is a signal timing diagram of a binocular telescope according to some embodiments. FIG. 5B is a schematic diagram of distance measurement of a binocular telescope according to some embodiments. Reference is made to FIGS. 5A and 5B in combination with FIG. 4. According to some embodiments, the processor 1082, after receiving a driving signal, sends a starting signal $S_{start}$ to the time-to-digital converter 1083 and drives the switching driving circuit 1071 of the light emitting and receiving module 107. The switching driving circuit 1071 is driven to send a first time signal to the time-to-digital processor 1082 and turn on the switching circuit 1072 to further cause the light emitter 1073 to emit light. Time differences between receiving time of the starting signal $S_{start}$ and the first time signal by the time-to-digital converter 1083 and emission time $T_{emit}$ of the light emitter 1073 are negligible. After being emitted to the observed target and reflected, the light is received by the light receiver 1074 after traveling totally twice the distance D and spending the interval time IT. The preamplifier (e.g., the transimpedance amplifier 1075) amplifies a signal of the light receiver 1074 and outputs a positive/negative signal to the differential amplifier 1076. Therefore, the differential amplifier 1076 generates a differential signal Sm of a negative potential and a differential signal $S_{D2}$ of a positive potential. The comparator 1077 compares the differential signal Sm and the differential signal $S_{D2}$ and then outputs a comparison signal $S_{compare}$, i.e., a second time signal, to the time-to-digital converter 1083. A time difference between time when the time-to-digital converter 1083 receives the second time signal and receiving time $T_{receive}$ of the light receiver 1074 is negligible. Therefore, the processor 1082 subtracts the second time signal (the emission time $T_{emit}$) from the first time signal (the receiving time $T_{receive}$), multiplies a difference by the light velocity, and divides a product by two to obtain distance information of the observed target. FIG. 5A takes a single pulse wave as an example. However, the light emitting and receiving module 107 may also emit multiple continuous pulsed beams to obtain a plurality of pieces of distance information of the observed target, and then average the distance information or remaining distance information after outliers are removed to obtain a relatively accurate measured value.

Figure 6:
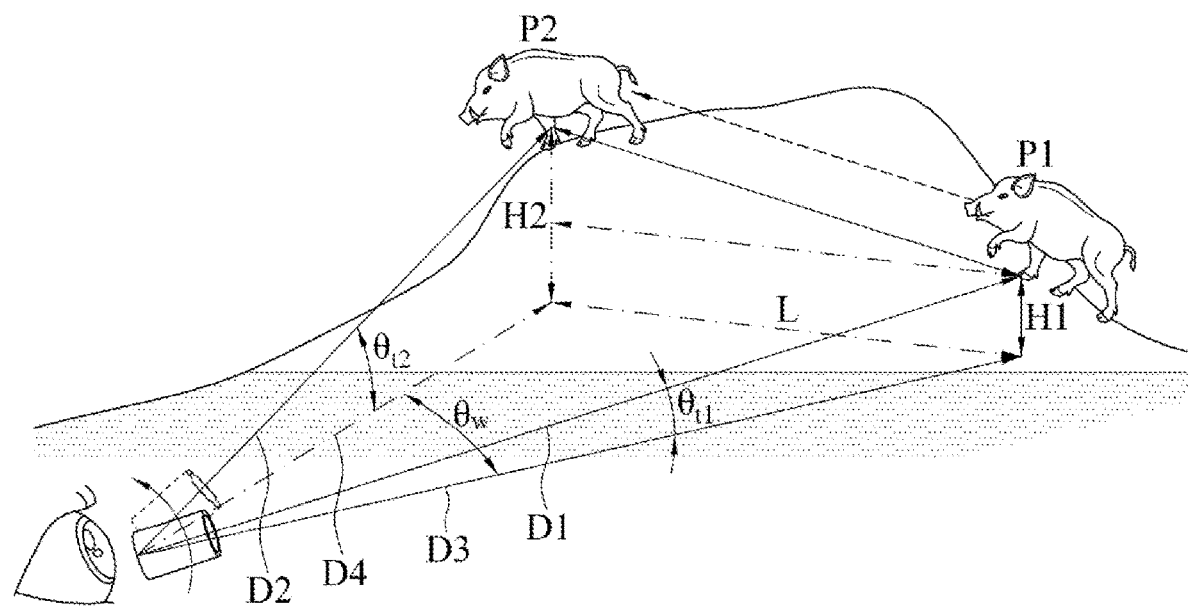
FIG. 6 is a schematic diagram of a binocular telescope in use according to some embodiments.

FIG. 6 is a schematic diagram of a binocular telescope in use according to some embodiments, and reference is made to FIG. 6 in combination with FIG. 4. According to some embodiments, the control module 108 includes a wakeup time controller 1081, a processor 1082, a time-to-digital converter 1083, and an inclinometer 1084. The inclinometer 1084 is electrically connected to the processor 1082. When the binocular telescope 1 rotates obliquely or horizontally, an angle signal corresponding to an inclination angle or a horizontal rotation angle is generated and sent to the processor 1082. According to some embodiments, the inclinometer 1084 may be implemented by a gyroscope or an acceleration sensor. When the user observes a target at position P1 with the binocular telescope 1, a switch may be pressed down to drive the wakeup time controller 1081, and the processor 1082 further obtains information such as a distance D1 from the target and an elevation angle $\theta_{t1}$. When the user observes with the binocular telescope 1 that the target moves to position P2, the switch may be pressed down again to drive the wakeup time controller 1081, and the processor 1082 further obtains information such as a distance D2 from the target, an elevation angle $\theta_{t2}$, and a horizontal rotation angle $\theta_w$. The processor 1082 calculates the cosine and sine of the elevation angle $\theta_{t1}$ for the distance D1 to further obtain a horizontal distance D3 and a vertical height H1, and calculates the cosine and sine of $\theta_{t2}$ for the distance D2 to further obtain a horizontal distance D4 and a vertical height H2. Furthermore, the processor 1082 may calculate a horizontal displacement L of the target according to the following formula 1:

$$\sqrt{D_3^2 + D_4^2 - 2D_3 D_4 \cos\theta_w} \text{(Formula 1)}.$$

The processor 1082 may calculate a vertical displacement of the target according to the following formula 2:

$$|H2 - H1|, \text{ if}(\theta t2 = \theta t1 = 0); (H2 + H1), \text{ if } \theta t2 < 0 \text{ or } \theta t1 < 0 \quad \text{(Formula 2)}.$$

According to the Pythagorean theorem, a travel distance of the target from position P1 to position P2 is calculated according to the horizontal displacement L and the vertical displacement. In addition, according to some embodiments, the processor 1082 calculates a time difference between time when the user presses down the switch twice or a time difference between two first time signals or second time signals to obtain time for the movement of the target from position 1 to position P2, thereby inferring an average moving speed of the target from P1 to position P2. In summary, according to some embodiments, the binocular telescope 1 may obtain target information such as a target distance, a target angle, a target travel distance, and a target moving speed. The target information may also be provided for the user through the display screen 110.

According to some embodiments, the battery 1091 of the power management module 109 is electrically connected to the direct-current circuit 1093 through the overvoltage protection circuit 1092. The battery 1091 may be electrically connected to the wakeup time controller 1081 of the control module 108 to directly power the wakeup time controller. The overvoltage protection circuit 1092 is configured to prevent an overvoltage or overcurrent, and may be, but not limited to, a circuit consisting of a Zener diode, or a fuse. According to some embodiments, the wakeup time controller 1081 may be electrically connected to the overvoltage protection circuit 1092, and cuts power provided for other elements through the overvoltage protection circuit 1092. The direct-current circuit 1093 is electrically connected to the processor 1082. The direct-current circuit 1093 may be a boost circuit or a buck circuit, so as to provide power consistent with a rated voltage value of the processor 1082. The power supply circuit 1095 is electrically connected to the light emitting and receiving module 107 and the time-to-digital converter 1083, so as to power these elements. The transfer switch 1094 may be, but not limited to, a push switch, a toggle switch, a slide switch, and other switches, so as to switch each element to be powered or not. According to some embodiments, the transfer switch 1094 is electrically connected to the power supply circuit 1095 and the inclinometer 1084, and may adjust whether to power the power supply circuit 1095 or the inclinometer 1084 as required. For example, the transfer switch 1094 turns off the inclinometer 1084 and turns on the power supply circuit 1095 when the user presses the transfer switch 1094 to switch the binocular telescope 1 to a distance measurement mode. The transfer switch 1094 turns on the inclinometer 1084 and the power supply circuit 1095 when the user presses the transfer switch 1094 to switch the binocular telescope 1 to a speed measurement mode or an angle measurement mode. Therefore, the binocular telescope 1 needs to turn on or turn off part of elements responsive to being adjusted to different modes, so as to achieve a power saving effect. According to some embodiments, the direct-current circuit 1093 directly powers the processor 1082. Therefore, the transfer switch 1094 only adjusts the power provided for the power supply circuit 1095 and the inclinometer 1084 without affecting the power supply of the processor 1082.

In summary, according to some embodiments, with the arrangement of the prisms, the circuit boards of the binocular telescope 1 may be arranged at one side of the binocular telescope 1 in a centralized manner, so that the complexity in production and maintenance is reduced effectively. According to some embodiments, the binocular telescope 1 distinguishes the main circuit board 111 from the auxiliary circuit board, which is favorable for assembling and replacing a circuit board component and favorable for finely adjusting the distance between the optical element on the circuit board and the prism, simplifying the calibration during production, and in addition, reducing noise interferences between the circuit elements. According to some embodiments, the binocular telescope 1 provides distance measurement, angle measurement and speed measurement, and thus the application scenarios may be expanded.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A binocular telescope, comprising:
a pair of Schmidt-Pechan roof prisms, wherein each of the Schmidt-Pechan roof prisms comprises a first half pentaprism and a Schmidt roof prism, each of the first half pentaprisms comprises a first lateral surface, and the first lateral surface of each of the first half pentaprisms substantially faces the other first half pentaprism;
a second half pentaprism, connected to the first lateral surface of one of the first half pentaprisms and comprising a second lateral surface, wherein the second lateral surface of the second half pentaprism substantially faces the other first half pentaprism;
a right-angle prism, comprising a third lateral surface and a fourth lateral surface, wherein the third lateral surface and the fourth lateral surface are spatially perpendicular to each other, the third lateral surface of the right-angle prism is connected to the second lateral surface of the second half pentaprism, a normal of the fourth lateral surface of the right-angle prism is perpendicular to an imaginary plane, and the imaginary plane comprises a normal of the first lateral surface and a normal of the second lateral surface;
a main circuit board, comprising a control module; and
an auxiliary circuit board, comprising a light emitting and receiving module, wherein the light emitting and receiving module comprises a light emitter and a light receiver, and the light emitter and the light receiver are arranged above the fourth lateral surface of the right-angle prism and electrically connected with the main circuit board respectively.

2. The binocular telescope according to claim 1, further comprising a pair of collimation lenses, wherein one of the collimation lenses is arranged between the light emitter and the fourth lateral surface of the right-angle prism, and the other collimation lens is arranged between the light receiver and the fourth lateral surface of the right-angle prism.

3. The binocular telescope according to claim 1, wherein two second half pentaprisms are arranged and connected to the first lateral surfaces of the first half pentaprisms respectively; two right-angle prisms are arranged, and the third lateral surface of each of the right- angle prisms is connected to the second lateral surface of each of the second half pentaprisms; the auxiliary circuit board comprises a first auxiliary circuit board and a second auxiliary circuit board; and the light emitter is arranged on the first auxiliary circuit board, and the light receiver is arranged on the second auxiliary circuit board.

4. The binocular telescope according to claim 3, wherein the light emitter is fixed to a surface of the first auxiliary circuit board by welding or inserting, and the light receiver is fixed to a surface of the second auxiliary circuit board by welding or inserting.

5. The binocular telescope according to claim 3, wherein the first auxiliary circuit board is movably arranged above the fourth lateral surface of one of the right-angle prisms, and the second auxiliary circuit board is movably arranged above the fourth lateral surface of the other right-angle prism.

6. The binocular telescope according to claim 3, wherein the main circuit board is disposed between the first auxiliary circuit board and the second auxiliary circuit board, and the main circuit board is parallel to a plane where the first auxiliary circuit board and the second auxiliary circuit board are located.

7. The binocular telescope according to claim 3, wherein each of the Schmidt-Pechan roof prisms, each of the second half pentaprisms and each of the right-angle prisms are symmetrically arranged at left and right sides of the binocular telescope.

8. The binocular telescope according to claim 1, further comprising a display screen, wherein the display screen is arranged between the two Schmidt-Pechan roof prisms and electrically connected to the control module, and light generated by the display screen is reflected by the second half pentaprism to enter the Schmidt-Pechan roof prisms.

9. The binocular telescope according to claim 8, further comprising a projection lens group, wherein the projection lens group is arranged between the display screen and the second half pentaprism.

10. The binocular telescope according to claim 1, wherein the first half pentaprism and the Schmidt-Pechan roof prism, the first half pentaprism and the second half pentaprism as well as the second half prentaprism and the right-angle prism are connected in a gluing manner.

11. The binocular telescope according to claim 1, the light emitting and receiving module comprising:
a switching driving circuit, configured to generate a first time signal;
a switch, coupled to the switching driving circuit and configured to receive the first time signal and adjust an on/off state according to the first time signal;
a light emitter, coupled to the switch and configured to emit light; and
a light receiver, configured to receive the light and convert the light into an electric signal; and
the binocular telescope further comprising a control module, the control module comprising:
a time-to-digital converter, coupled to the switching driving circuit and the light receiver and configured to receive and convert the first time signal into first time information as well as receive and convert a second time signal generated according to the electric signal into second time information;
an inclinometer, configured to generate angle information;
a memory, configured to store two sets of the first time information, the second time information corresponding to the first time information and the angle information; and
a processor, coupled to the inclinometer, the memory, the time-to-digital converter and the switching driving circuit and configured to control the switching driving circuit, calculate a first distance according to one of the two sets of the first time information and the second time information corresponding to the first time information stored in the memory, calculate a second distance according to the other set of the first time information and the second time information corresponding to the first time information stored in the memory and calculate speed information according to the first distance, the second distance, the angle information and a time difference between the two sets of the first time information.

12. The binocular telescope according to claim 11, wherein the light emitting and receiving module further comprises a differential amplifier and a comparator; the light receiver of the light emitting and receiving module is coupled to the time-to-digital converter of the control module through the differential amplifier and the comparator; the differential amplifier receives the electric signal from the light receiver and sends a differential signal to the comparator; and the comparator converts the differential signal into the second time signal.

13. The binocular telescope according to claim 12, wherein the light receiver is a photodiode; the light emitting and receiving module further comprises a transimpedance amplifier; and the photodiode is coupled to the time-to-digital converter of the control module through the transimpedance amplifier, the differential amplifier and the comparator.

14. The binocular telescope according to claim 11, wherein the angle information comprises inclination angle information and horizontal rotation angle information; and the processor calculates horizontal displacement information according to the following formula:

$$\sqrt{(D1\cos\theta t1)^2 + (D2\cos\theta t2)^2 - 2(D1\cos\theta t1)(D2\cos\theta t2)\cos\theta w}$$

calculates vertical displacement information according to the following formula:

$|\sin \theta t2 - |\sin \theta t1|,\text{when } \theta_{t2}=\theta_{t1}=0;(\sin \theta t2+\sin \theta t1),$
$\text{when } \theta_{t2}=<0 \text{ or } \theta_{t1}<O,$ and calculates the speed information according to the horizontal displacement information, the vertical displacement information and the time difference between the two sets of the first time information,
wherein D1 represents the first distance, D2 represents the second distance, $\theta_{t1}$ represents inclination angle information corresponding to D1, $\theta_{t2}$ represents inclination angle information corresponding to D2, and Ow represents the horizontal rotation angle information.

15. The binocular telescope according to claim 11, further comprising a power management module, wherein the power management module comprises a battery, a transfer switch and a power supply circuit; the power supply circuit is configured to power the light emitting and receiving module; the battery is coupled to the transfer switch; and the transfer switch is configured to adjust power provided for the power supply circuit and the inclinometer.

16. The binocular telescope according to claim 15, wherein the power supply circuit is coupled to the light emitting and receiving module and the time-to-digital converter; and the battery is configured to directly power the processor and indirectly power the light emitting and receiving module and the time-to-digital converter through the transfer switch and the power supply circuit.

17. The binocular telescope according to claim 11, further comprising a power management module, wherein the power management module comprises a battery and an overvoltage protection circuit; the overvoltage protection circuit is coupled to the battery and configured to power the processor; and the control module further comprises a wakeup time controller, configured to send a driving signal to the processor and control the overvoltage protection circuit to stop powering the processor a preset time later after sending the driving signal.

18. The binocular telescope according to claim 11, wherein the processor is connected with the time-to-digital converter through a serial peripheral interface.

\* \* \* \* \*